June 19, 1928.
H. A. BERKMAN
1,674,614
PUMP FOR AUTOMOBILE OILING SYSTEMS
Filed July 13, 1925   2 Sheets-Sheet 1
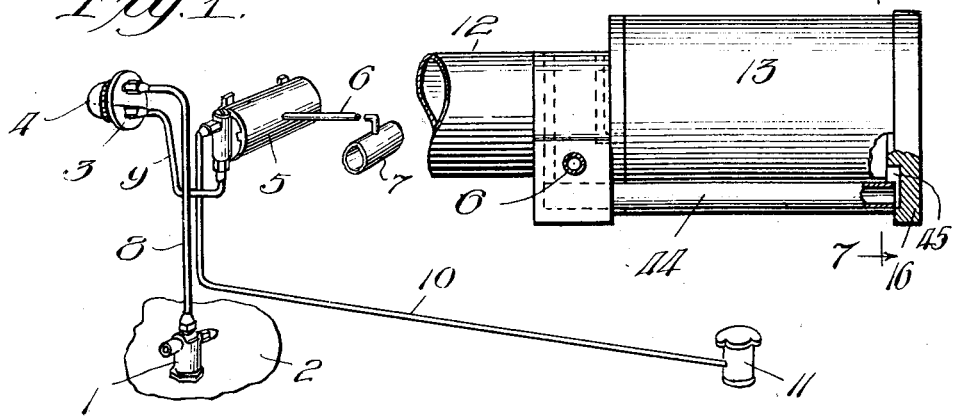
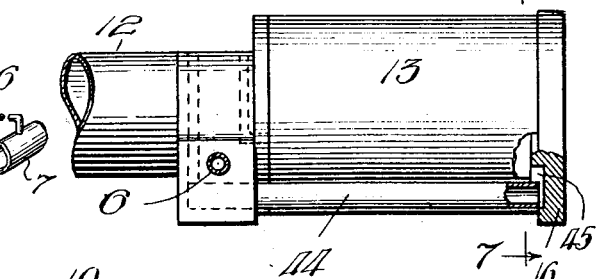
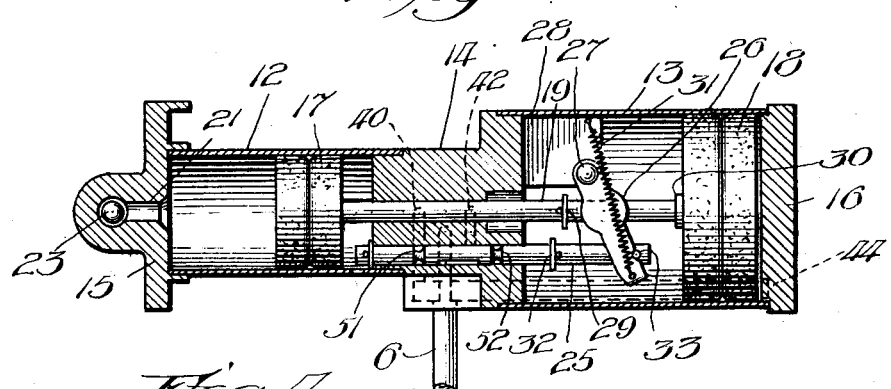
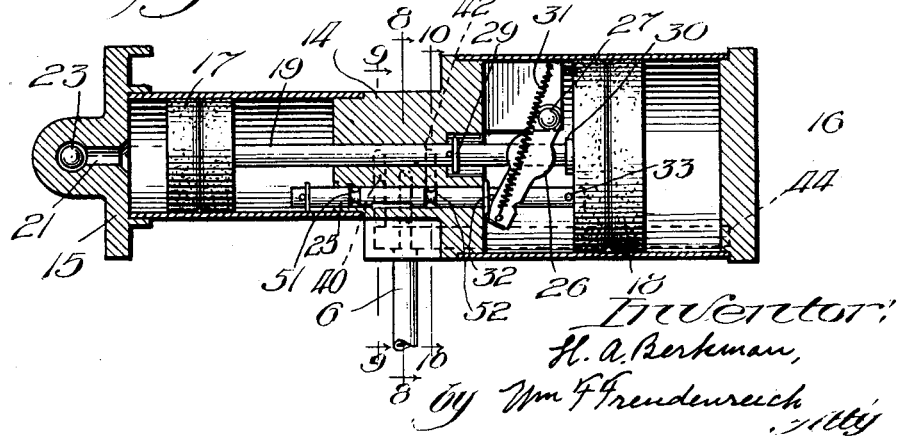

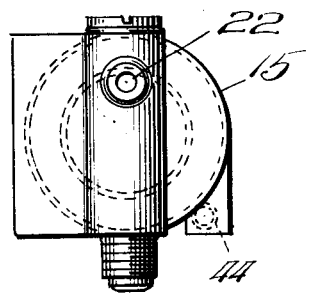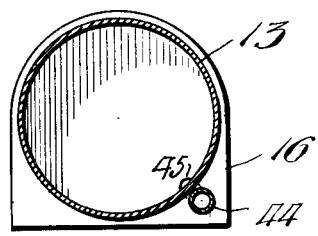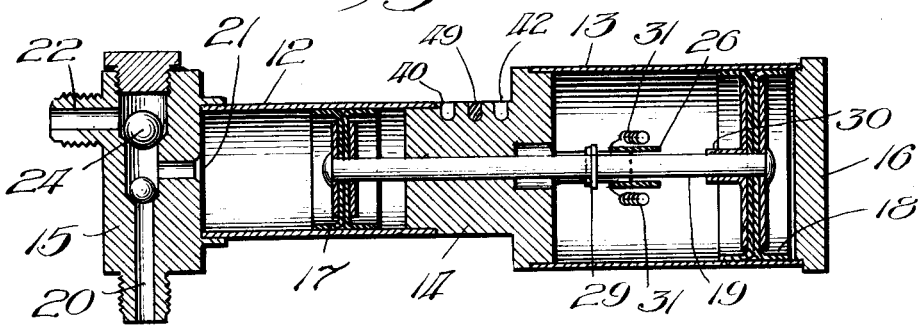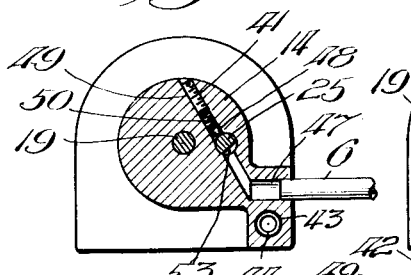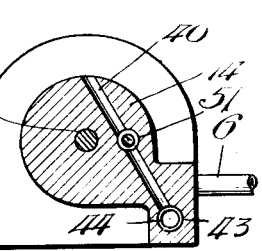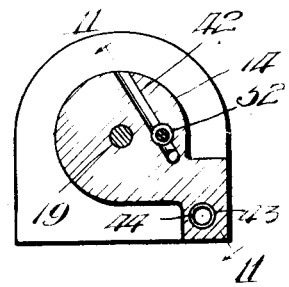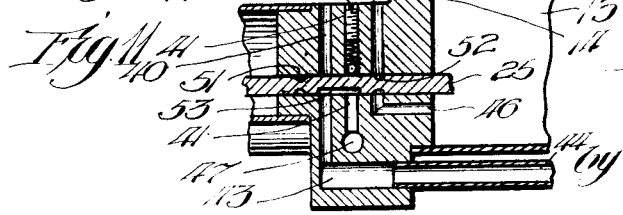

Patented June 19, 1928.

1,674,614

UNITED STATES PATENT OFFICE.

HERBERT A. BERKMAN, OF CHICAGO, ILLINOIS, ASSIGNOR TO ZIM MANUFACTURING COMPANY, A CORPORATION OF ILLINOIS.

PUMP FOR AUTOMOBILE OILING SYSTEMS.

Application filed July 13, 1925. Serial No. 43,098.

The present invention relates to that type of oiling system in which the oil is pumped from an automobile engine crank case and back again to parts to be lubricated, through a circuit having a transparent portion within the range of vision of the driver of the automobile; and has for its object to produce an improved system which shall positively pump the oil by means of an air motor caused to operate by the suction of the automobile engine.

A further object of the present invention is to produce a simple and novel pumping apparatus including an air motor and a connecting pump so arranged that there is no danger of oil being drawn into the engine cylinder through the connection between said cylinder and the air motor.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a more or less diagrammatic view showing my improved system with only so much of the automobile construction as is necessary to show its application; Fig. 2 is a side view, on an enlarged scale, of a portion of the motor and pump, with the casing removed and parts broken away; Fig. 3 is a longitudinal section through the combined motor and pump, showing the pump at the end of a suction stroke;- Fig. 4 is a view similar to Fig. 3, showing the parts when the pump is at the end of a discharge stroke; Fig. 5 is a central section through the motor and pump taken at right angles to the plane of Fig. 3; Fig. 6 is an end view of the device, looking at the left hand end of Fig. 3; Fig. 7 is a section taken approximately on line 7—7 of Fig. 2; Figs. 8, 9 and 10 are sections taken respectively on lines 8—8, 9—9, and 10—10 of Fig. 4; and Fig. 11 is a section taken on line 11—11 of Fig. 10.

Referring to Fig. 1 of the drawings, 1 represents a small trap adapted to be attached to the crank case 2 of an automobile engine by a suitable nipple screwed into the openings for one of the pet cocks commonly employed for the purpose of testing the oil level in the crank case. 3 is a small receptacle having a transparent wall 4, the receptacle being adapted to be attached in any usual or suitable way to the dash of the automobile. 5 represents a combined air motor and pump having a suction pipe 6 leading to the inlet manifold 7 of the engine. There is a pipe 8 leading from the trap 1 to the upper portion of the indicating receptacle 3. A second pipe 9 leads from the bottom of the member 3 to the suction side of the pump, while a third pipe 10 connects the discharge side of the pump to any suitable delivery point as, for example, the cap 11 of the breather pipe. When the pump is in operation, oil is drawn from the trap into the indicating receptacle and drops down behind the transparent wall of the latter, so that the driver may see at all times whether or not the oil is circulating. The oil is then drawn into the pump and finally discharged at the point where the lubricant is initially to be applied.

The details of the combined motor and pump are shown in the remaining figures of the drawings. The pump and motor cylinders 12 and 13 are arranged in axial alignment with each other, the pump cylinder being smaller in diameter than the other, and both being conveniently made from sections of tubes. The two cylinders have a common head consisting of a solid block 14 of metal shaped at one end to fit into one end of the cylinder 12 and at its other end to fit into an end of the cylinder 13. The other ends of the cylinders 12 and 13 are closed by heads 15 and 16; the members 14, 15 and 16 being conveniently in the form of die castings. In the pump cylinder is a piston 17 and in the cylinder 13 is a piston 18. The two pistons are connected by a piston rod 19 to which the two pistons are fixed; this rod passing through the head 14 which is comparatively thick in the direction of the length of the piston rod, so as to provide a long bearing for the latter.

The head 15 of the pump cylinder has an inlet passage 20 extending upwardly from the bottom thereof and communicating with a passage 21 leading into the interior of the pump cylinder. There is also a discharge passage 22 extending into the upper portion of the head and communicating with the passage 21. Between the passage 21 and the inlet passage 20 is a downwardly seating check valve 23 and, between the passage 21 and the discharge passage 22 is another downwardly seating check valve 24. The check valve 23 permits oil to be drawn into the pump cylinder through the passage 20, but prevents discharge outwardly through this passage. The valve 24, on the other hand, permits oil to be discharged from the pump cylinder through the passage 22. Therefore as the pistons move toward the right as viewed in Fig. 5, oil is drawn into the pump and, as the pistons travel toward the left, the oil is forced out through the discharge passage.

The piston 18 serves as the actuator for the pump, being moved first in one direction and then the other by the pressure of the surrounding atmosphere; a partial vacuum being created in advance of the traveling piston through the connection with the intake manifold of the engine. It is therefore necessary to provide suitable valve mechanism alternately to connect the opposite ends of the cylinder 13 first to atmosphere and then to the suction pipe. The movable member of this valve device consists of a long cylindrical bar 25 extending through the head 14 parallel with and at some distance from the piston rod. This valve member is operated by the movement of the piston rod through a suitable actuator that takes the form of a swinging fork 26 pivoted at its closed end, as at 27, to a lug 28 projecting from the head 14 into the cylinder 13. The member 26 straddles both the piston rod and the movable valve member. There are on the piston rod two separated shoulders, 29 and 30, spaced apart from each other a distance considerably greater than the width of the member 26, so that the piston rod may move a limited distance independently of the latter. A spring 31 acts on the member 26 to hold it on either side of a neutral position, and, when said member is moved from one limit slightly past the neutral position, to carry it to the other limit of its movement. Therefore, assuming the parts to be as shown in Fig. 3, it will be seen that the piston 18 may move toward the left a considerable distance before the shoulder 30 strikes the actuating member. Further movement of the piston, in the same direction, causes the actuating member to swing in a clockwise direction until it reaches its neutral position, whereupon the spring throws the actuating member ahead to its other extreme position as indicated in Fig. 4. Then, when the piston starts to travel toward the right, the valve actuating member remains stationary until the shoulder 27 is brought into engagement therewith; whereupon the valve actuator is swung in a counter clockwise direction and is finally snapped over into the position shown in Fig. 3. In other words, the two pistons may travel a predetermined distance in each direction without affecting the valve actuator and then, just before the end of a stroke is reached, the valve actuator will be snapped into a position to reverse the direction of travel.

The valve actuator plays between two pins or projections 32 and 33 on the valve member 25. Assuming the valve member to be in one working position in Fig. 3, it will be seen that as the pistons move toward the left, it will remain stationary, even after the valve actuator begins to swing in the clockwise direction. However, as the actuator is snapped from its neutral position into the position shown in Fig. 4, it engages the pin or projection 32 and moves the valve member toward the left. Similarly, when the pistons move toward the right from the position shown in Fig. 4, the movable valve member remains stationary until the final quick movement of the actuator, under the influence of its spring, throws the valve member toward the right. It will therefore be seen that the shifting of the movable valve member is practically instantaneous, since it does not begin to move until the final quick snapping movement of the actuator in one direction or the other. Consequently the valves are shifted instantly and all danger of a locking of the pistons due to a slow valve movement that might permit the pressure to be equalized on opposite sides of the piston 18 is avoided.

The ports controlled by the movable valve member 25 are contained in the cylinder head 14. As best shown in Figs. 8 to 11, there are three passages, 40, 41 and 42 extending diagonally through the middle portion of the cylinder head 14 from the top thereof; each of these passages intersecting the opening in which the valve member 25 slides. The inner or lower end of the passage 40 communicates with a horizontal bore 43 into which is fitted one end of a pipe 44 which, as shown in Fig. 2, leads to the cylinder head 16 where its open end communicates with a passage 45 that opens into the end of the cylinder 13. The passage 42 is connected at its inner end to a horizontal passage 46 that opens directly into the adjacent end of the cylinder 13. The inner end of the passage 41 terminates in a horizontal bore 47 into which the suction pipe 6 is fitted. The outer ends of the passages 40 and 42 communicate with atmosphere, whereas the portion of the passage 41 outwardly from the valve member 25 contains a yielding pressure device for engagement with the movable valve member. In the arrangement shown, the pressure device consists of a ball 48 resting on the valve member 25, a plug 49 screwed into the outer end of the passage, and a spring 50 between the plug and the ball.

The movable valve member 25 is so constructed and arranged that in one of its working positions it connects the passage 46, leading into the cylinder 13, to atmosphere and simultaneously connects the lower end of the passage 40 to the suction pipe 6; whereas, in its other working position, it connects the passage 46 to the suction pipe, and connects the pipe 44 to atmosphere through the passage 40. In other words, in one position of the valve it connects the right hand end of the motor cylinder to atmosphere and the left hand end to the suction pipe, while in its other position it connects the left hand end to atmosphere and the right hand end to the suction pipe. To permit the valve to operate in the manner just explained, it is provided with separated peripheral grooves, 51 and 52 extending around the same, together with a concavity 53 in the bottom side thereof between the two grooves. The concavity is made of such a length that it will bridge the space between the passage 41 and the passage 40, in one position, and the space between the passage 41 and 42 in its other position. The grooves 51 and 52 are so disposed that one or the other registers with the third passage whenever the concavity in the movable valve member spans the other two passages.

In Fig. 11 the valve is shown in the position corresponding to that of Fig. 4, in which the motor piston and pump piston are at the left hand limit of their movements; this condition having been brought about by the snapping of the valve member 25 from its other working position an instant before the pistons reached the ends of their stroke. The left hand end of the motor cylinder is now connected to atmosphere and the right hand end is connected to the intake manifold of the engine. Consequently a partial vacuum will be created in the right hand end of the motor cylinder and the air, rushing through the passages 42 and 46 into the left hand end of the motor cylinder, will cause the connected pistons to move toward the right, from the positions shown in Fig. 4 to those shown in Fig. 3. Just before the pistons reach the position shown in Fig. 3, the valve actuator will have been snapped toward the right, causing the valve member 25 to move toward the right, as viewed in Fig. 11, and thereby bringing the groove 51 into registration with the passage 40 and the concavity 53 into registration with the lower portions of the passages 41 and 42. This shifting of the valve connects the left hand end of the motor cylinder to the engine intake, and the right hand end to atmosphere; so that the connected pistons will be caused to travel toward the left. This movement of the pistons will continue and be repeated as long as the engine is running. During each cycle, as heretofore explained, oil will be drawn into the pump cylinder and then forced out into the lubricating system.

While I have illustrated and described with particularity only a single preferred form of my invention, I do not desire to be limited to the exact structural details thus illustrated and described; but intend to cover all forms and arrangements which come within the definitions of my invention constituting the appended claims.

I claim:

1. A combined pump and motor, comprising two aligned cylinders having an elongated head between and common to the same, a piston element consisting of a piston in each cylinder and a piston rod extending through said head and connected to both of said pistons, a suction pipe connected to said head, a valve device, including a slidable valve member arranged in said head parallel with said piston rod, and means associated with said piston element for quickly shifting said valve member from one working position to another, alternately to connect each end of one of said cylinders to said suction pipe and the opposite end to atmosphere, as said piston element approaches each end of its stroke, and means associated with the other of said cylinders to permit fluids to be pumped by the latter.

2. In a device of the character described, a cylinder having heads at its ends, a piston in said cylinder, valve mechanism including a series of passages in one of said heads and a movable valve member slidable in the latter head in the direction of the length of the cylinder and transverse to said passages, a swinging valve actuator provided with a spring for snapping it from a central position to either limit of its movement, shoulders on said valve member between which said actuator plays, and a part connected with said piston and having thereon shoulders spaced apart from each other in the direction of the length of the cylinder and lying on opposite sides of said actuator, the latter shoulders being so disposed that one of them engages the actuator when the piston approaches one end of its stroke while the other engages the actuator when the piston approaches the other end of its stroke.

3. In a device of the character described, a cylinder having heads at its ends, a piston in said cylinder, a piston rod connected to said piston and extending through one of said heads, a controlling valve device in the latter head including a movable valve member arranged parallel with and slidable in the direction of the length of said piston rod, a swinging valve actuator supported at one end and extending past said piston rod and said movable valve member, a spring acting on said actuator to snap it from a central position to either limit of its movement, said movable valve member having shoulders thereon lying on opposite sides of said actuator and spaced apart a distance greater than the width of the actuator, and said piston rod having thereon shoulders lying on opposite sides of the actuator and spaced apart from each other a distance considerably greater than the width of the actuator.

In testimony whereof, I sign this specification.

HERBERT A. BERKMAN.